Jan. 15, 1946.   B. JOHNSON ET AL   2,393,106
FURNACE
Filed Dec. 8, 1942   3 Sheets-Sheet 3
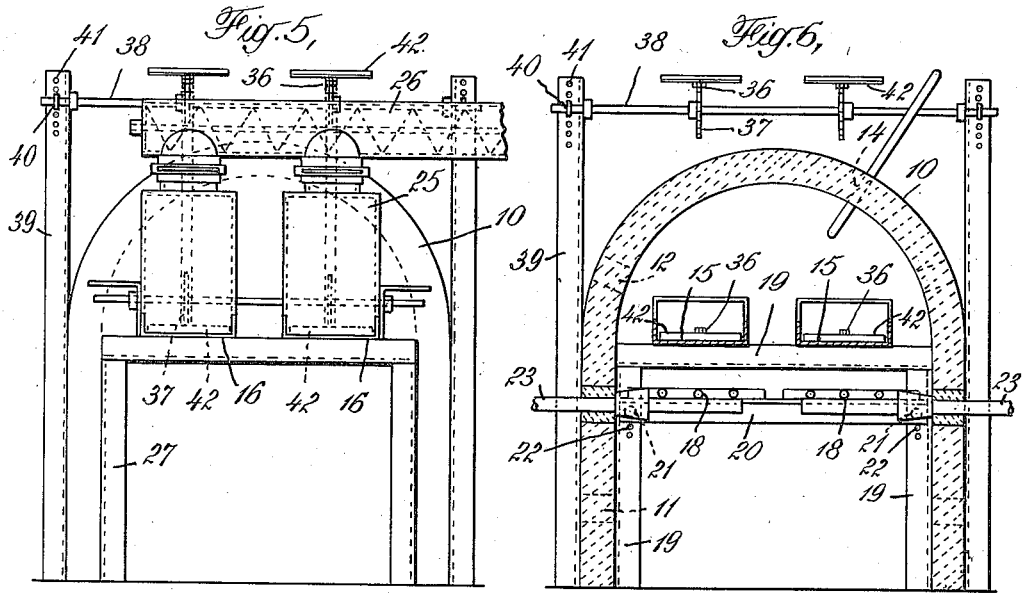
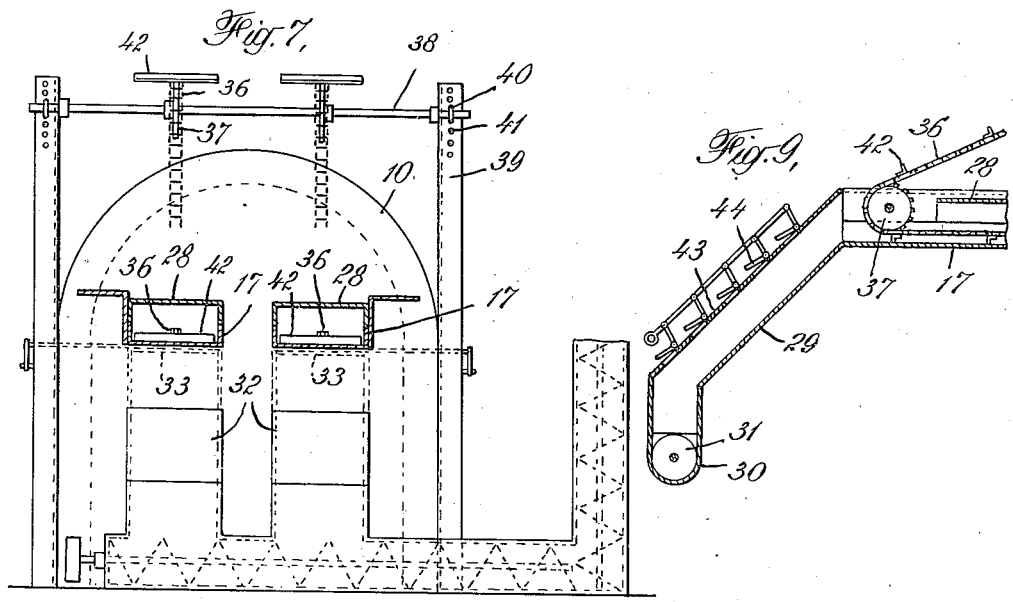
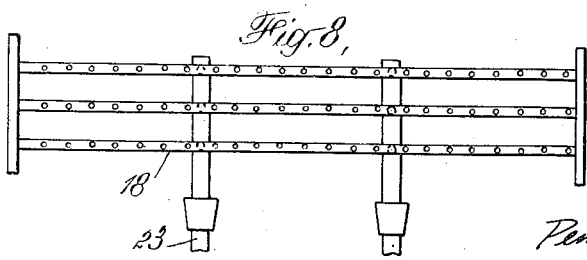
INVENTORS
Bernard Johnson &
Henry C. Foster
BY
ATTORNEYS Patented Jan. 15, 1946

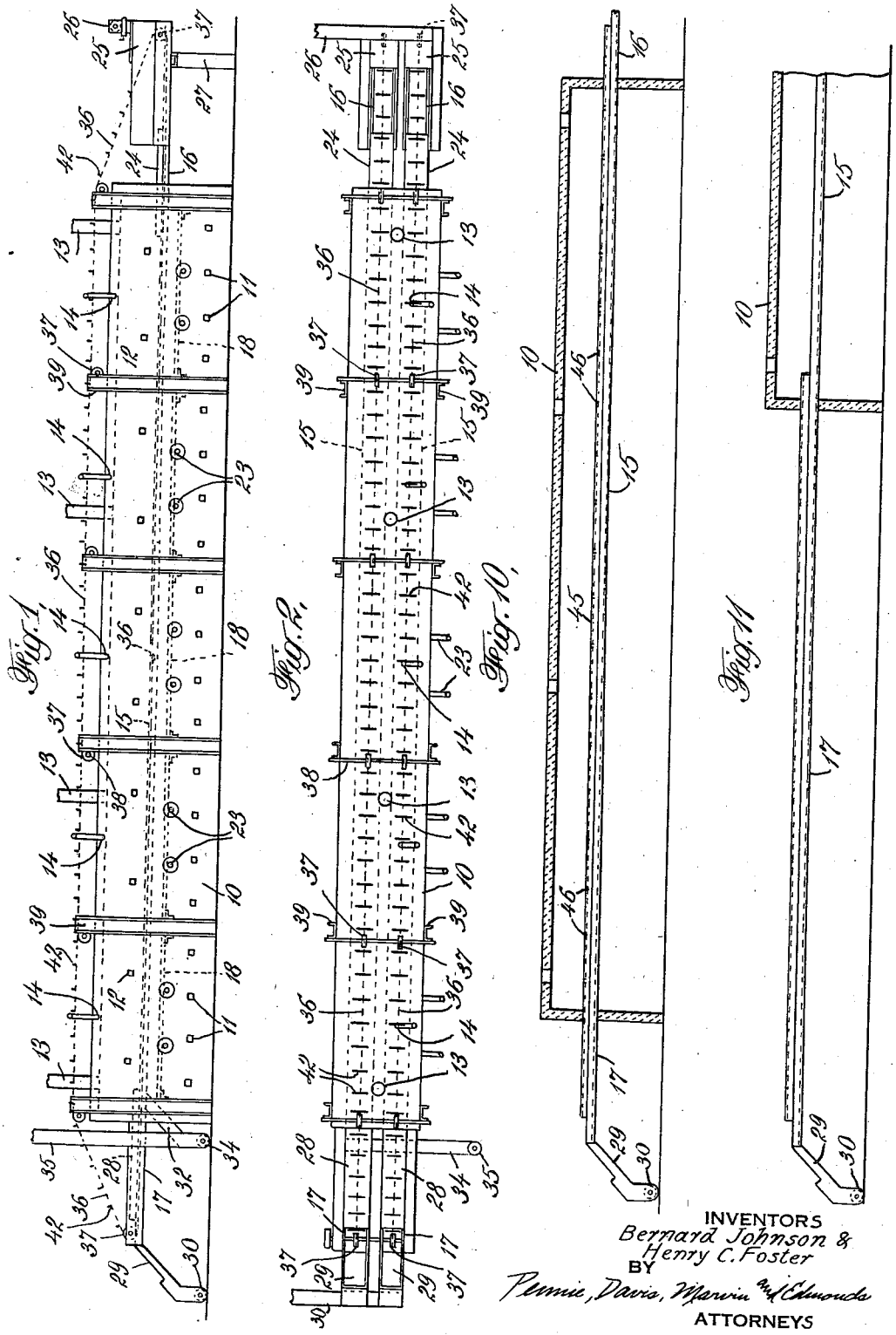

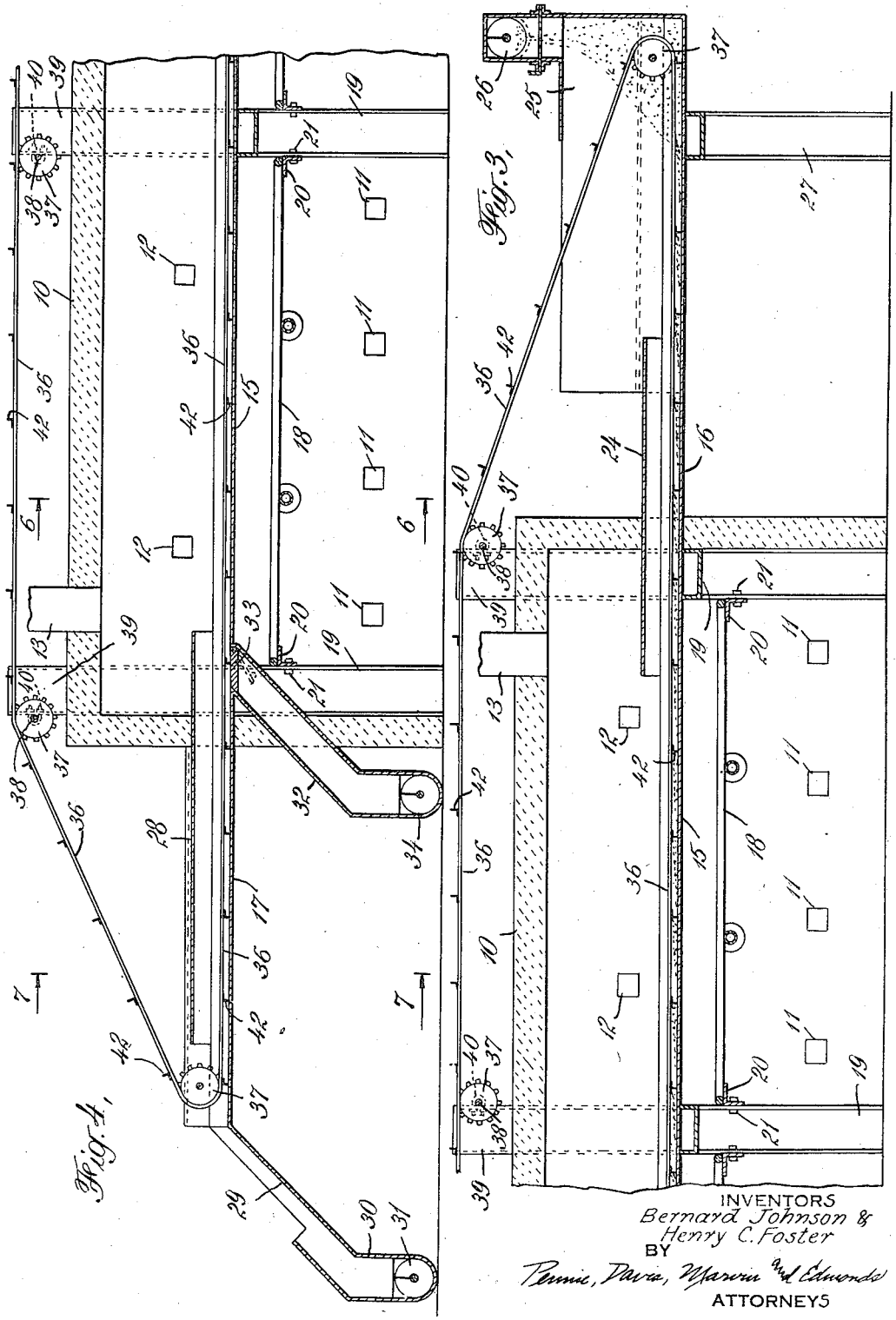

2,393,106

UNITED STATES PATENT OFFICE 2,393,106

FURNACE

Bernard Johnson, Lefors, Tex., and Henry C. Foster, Pittsburgh, Pa., assignors to Columbian Carbon Company, a corporation of Delaware Application December 8, 1942, Serial No. 468,284

6 Claims. (Cl. 23—259.5)

This invention relates to the treatment of carbon black and more particularly to improvements in furnaces for the treatment of carbon black at elevated temperatures for the purpose of imparting modified properties to the carbon black.

Carbon black, as generally produced, contains an appreciable quantity of volatile constituents. In the case of carbon black of medium volatile content produced by the so-called channel process, for example, the carbon black is composed of about 92 or 93% carbon and about 7 or 8% volatile constituents, principally oxides of carbon. The properties of carbon black change with variations in its content of volatile constituents. Variation in the volatile content of a carbon black may be effected by treatments known as activation and de-activation. Activation involves exposure of the black at elevated temperatures to oxygen-containing gas, such as air. Activation increases the volatile content of the black, appears to decrease its particle size, improves its color value for use as a pigment or the like, and modifies the black in other respects. De-activation, on the other hand, involves heating carbon black with exclusion of air to drive off its volatile constituents so that the resulting volatile content of the black may be as low as 1 or 2%, or even less. Activated carbon black incorporated in rubber retards vulcanization of the rubber even more so than ordinary carbon black, but de-activated carbon black incorporated in rubber does not materially retard vulcanization of the rubber.

The processes of activation and de-activation are well known, and apparatus designed to carry out one or the other of these processes has been proposed or used heretofore. However, the mutually incompatible conditions required for effecting activation and de-activation have restricted activation and de-activation apparatus to activation and de-activation processes, respectively.

The present invention provides improved apparatus in the form of improved furnaces adapted for carrying out either activation or de-activation of carbon black by subjecting it to the appropriate elevated temperature with exposure of the hot carbon black to air, with the exclusion of air from the hot carbon black, or control of the amount of air accessible to the hot carbon black, depending upon properties which it is desired to impart to the carbon black. The furnace is characterized by uniformity of operation, with ready and accurate control of operating conditions, so that carbon black of controlled properties, whether activated or de-activated, may be produced with uniformity. The furnace of my invention is readily converted from one type of operation to the other and facilitates adjustments in any operation where such adjustment is desirable.

The improved furnace of my invention comprises a horizontally disposed furnace shell with at least one channel extending longitudinally through the furnace shell. Propelling means, such as an endless chain provided with a plurality of propelling elements or drags extending transversely of the channel, is provided for moving carbon black at a substantially uniform rate progressively along the channel. Heating means is provided for heating the furnace, and hence for heating the carbon black in the channel within the furnace. Such heating means advantageously comprises gas burners disposed beneath the channel and provided with a large number of flame tips placed a sufficient distance below the channel so that the flames are substantially out of contact with the channel. Carbon black to be treated is supplied to the channel at one end of the furnace, and the carbon black carried along the channel is removed therefrom at the other end of the furnace by being discharged through chutes into suitable conveying equipment. The channel may advantageously project beyond the ends of the furnace shell to facilitate charging and discharging of carbon black passing through the furnace.

When the furnace is used for activation of carbon black the channel extending through the furnace shell is advantageously uncovered and an open chute is used for discharge of the hot black so as to expose it to the air. The use of an open channel within the furnace promotes reduction of the particle size of the carbon black. When the furnace is used for de-activation of carbon black, the discharge chute is covered and the conveying equipment for removing the treated black is closed so that the black is not exposed to the air until it is cooled to a temperature at which it is stable. If reduction of particle size of the de-activated black is not desired, the channel extending through the furnace is advantageously also covered. In accordance with one modification of the invention a covered discharge chute is used which is provided with means for controlling the admission of air thereto in order to produce at will either activated or de-activated carbon black.

These and other features of the novel furnace of my invention will be further understood by reference to the accompanying drawings, in which:

Fig. 1 is a side view of a furnace embodying the invention;

Fig. 2 is a plan view of the furnace shown in Fig. 1;

Fig. 3 is an enlarged cross-sectional side view of the charge or feed end of the furnace showing details of the feed equipment;

Fig. 4 is an enlarged cross-sectional side view of the discharge end of the furnace showing details of the discharge equipment;

Fig. 5 is an end view of the feed end of the furnace shown in Fig. 3;

Fig. 6 is a sectional view taken along line 6—6 in Fig. 4;

Fig. 7 is a sectional view taken along line 7—7 in Fig. 4 and showing further details of the discharge equipment;

Fig. 8 is a plan view of the gas burners which are used advantageously for heating purposes in the apparatus of the invention;

Fig. 9 is a cross-sectional view of a modified form of discharge equipment;

Fig. 10 is a side view of a modified form of furnace in accordance with the invention; and Fig. 11 is a side view of another modified form of furnace in accordance with the invention.

The furnace shown in Fig. 1 comprises a furnace shell 10 of fire brick or the like. The shell is constructed in several sections, five sections being shown, with each section having the shape of a horizontal crown furnace and each being substantially alike insofar as the arrangement of burners, openings, etc., is concerned. Thus, each section is provided on each side with air inlet openings 11 and observation openings 12. Four draft stacks 13 are distributed between the five shell sections with substantially equal spacing from one another. Each section is also provided with a temperature well opening 14 located in the crown portion of the shell.

Two horizontally disposed channels 15 extend longitudinally through the furnace shell 10, one end 16 of each channel projecting from one end (the charging end) of the furnace shell and the other end 17 of each channel projecting from the other end (the discharge end) of the furnace shell. The channels 15 are advantageously U-shaped channels having their flanges turned upwardly. A pair of gas burners 18, constructed as shown in Fig. 8, is disposed in each section of the furnace shell beneath the channels 15, one burner beneath each channel. Each burner is provided with a number of conventional hole carbon tips and is set about six inches below the channels 15 so that the flames from the burners do not impinge on the channels. Excessive local overheating, and hence non-uniform heating, of the carbon black is thus avoided. Both the channels and the burners are supported by suitable frame members 19, which may be formed of channel irons, disposed within the furnace shell, the burners advantageously being mounted on the adjustable bracket 20 adapted to be mounted by bolts 21 inserted in the spaced openings 22 in the frame members 19 to permit moving the burners vertically so that the burner flames may be adjusted to varying intensities while maintaining a sufficient spacing between the burners and the channels to prevent the burner flames from impinging thereon. The gas for the burners is supplied through the gas feed pipes 23 extending through the side walls of the furnace shell.

The channels 15 extend beyond the feed end of the furnace shell, indicated by the projecting portion 16 as shown in Figs. 1 and 2. Each channel is advantageously covered with another inverted channel member 24 covering the channels 15 for a short distance on both the inside and outside of the furnace shell. A loading box 25 is mounted at the end of each of these projecting portions 16 of the channels 15, carbon black being fed to the loading boxes by a suitable conveyor 26. The portion of each loading box adjacent the portion to which carbon black is fed by the conveyor 26 is covered to minimize dusting and the covering channel members 24 preferably extend a short distance inside each loading box, as shown in Fig. 3. The weight of the loading box on the end 16 of each channel is appropriately supported, as by the A-frame 27.

The channels 15 also extend beyond the discharge end of the furnace shell, indicated by the portion 17 as shown in Figs. 1 and 2. Each channel is covered with another inverted channel member 28 covering the channels 15 from a short distance inside the furnace to a point near the end of the discharge end portion 17 of each channel. The open discharge chutes 29 are connected to the discharge ends 17 of the channels and slope downwardly to a covered discharge bin 30 from which the treated carbon black is removed by the conveyor 31 to storage or to other equipment for further treatment of the black. The covered discharge chutes 32, advantageously of air-tight construction, extend into the interior of the furnace shell beneath each channel 15 so that if desired the carbon black may be dropped through a trap 33 into the covered discharge chute. The covered discharge chutes 32 slope downwardly to a closed (and preferably airtight) conveyor 34 feeding the discharged carbon black to the rotary lift 35, which maintains a solid column of carbon black acting as a seal to prevent access of air to the heated black being discharged from the furnace through the discharge chutes 32.

The propelling means for carrying the carbon black along the channels 15 comprises, in accordance with the specific embodiment of the invention, a continuous chain 36 driven by the sprocket wheels 37 disposed at the ends 16 and 17 of each channel. The chains 36 thus extend longitudinally throughout the length of the channels 15 from a point near the feed ends to a point near the discharge ends thereof. The chains return from the discharge ends to the feed ends of the channels by passing upwardly over the furnace, as shown in Fig. 1, the chains being supported by the sprocket wheels 37 mounted on the shafts 38 above the furnace shell. The shafts 38 are adjustably mounted on the frame members 39, disposed outside the furnace shell and advantageously formed of channel irons, by means of the U-bolts 40 set in spaced openings 41 along a flange of the channel irons (frame members) 39. The chains 36 are provided at spaced intervals with cross-pieces or drags 42 for carrying the carbon black along the channels 15, sections of angle-irons of proper length to fit transversely inside the channels being particularly satisfactory for this purpose.

In an actual embodiment of the furnace of the invention, the furnace comprises a fire brick shell four and one-half inches thick and thirty feet long, constructed in five 6-foot sections. Each section is provided on each side with four 3-inch air inlet openings and the furnace is provided with four 6-inch draft stacks. The furnace is fifty inches high and four feet wide, the two channels being positioned thirty inches above the bottom of the furnace. Each channel is twelve inches wide and three inches deep, the two channels being positioned six inches apart. The burners are constructed of one and one-quarter inch pipe and are placed about six inches below the channels. The channels extend about six feet beyond the feed end of the furnace shell and are covered from about eighteen inches inside the furnace to about eight inches inside the loading boxes. The channels also extend about four and one-half feet from the discharge end of the furnace shell, this portion of the channels being covered for a distance of from about twelve inches inside the furnace to within about twelve inches from the end of the channels.

In operation of the furnace, carbon black to be modified is delivered by the conveyor 26 to the loading box on the end of each channel 15. The drags 42 carry the carbon black at a uniform rate progressively along the channels, through the furnace shell within which the black is heated uniformly to the desired temperature and under the desired conditions, and discharge the treated black to the discharge chutes.

By discharging the hot carbon black from the ends of the channels 15 into the open discharge chutes 29, the hot black is exposed to air for the production of an activated black or a black with a high volatile content. The particle size of the black is also reduced, with resulting improvement in its color value as a pigment for example, by its being heated in the open channels where it is exposed to the furnace atmosphere. Although the degree of activation may be controlled by the length of the open discharge chutes 29 and by the speed at which the hot black passes down the chutes, more ready control of the degree of activation may be obtained by providing each discharge chute 29 with a cover 43 having the adjustable louvres 44, as shown in Fig. 9. By discharging the hot carbon black through the trap 33 in each channel into the covered discharge chutes 32, the hot black is permitted to cool out of contact with air so as to produce a de-activated or low volatile content black. Still further de-activation of the black, without substantial reduction of its particle size, however, may be obtained by providing a cover 45 throughout substantially the entire length of each channel 15 within the furnace shell, as shown in Fig. 10. Small holes 46 are provided at spaced intervals in such covers to permit the escape of gases liberated by the heat treatment.

In a modified form of the apparatus of the invention, the production of de-activated black can be accomplished readily by extending and covering the projecting discharge end portion 17 of each channel a considerable distance, about 25 feet for example, beyond the discharge end of the furnace shell as shown in Fig. 11. In accordance with this modification, the black is cooled while passing through the covered conduit and is sufficiently cool to be stable before being exposed to the air at the discharge end of the channel. This type of structure, however, is not made air-tight as conveniently as in the structure illustrated in the other figures of the drawings.

The modified form of apparatus illustrated in Fig. 11 also may be used with particularly effective results for activation of carbon black. When thus used for activation, the projecting discharge end portion 17 of each channel extending a considerable distance beyond the discharge end of the furnace is left uncovered with the result that the hot, evenly heated, carbon black conveyed along the projecting open channel is exposed to the air for a relatively long period of time while cooling to a temperature at which the activated black is stable.

The technical aspects of the degrees of activation and de-activation, obtained at various elevated temperatures and with varying degrees of exposure to air or oxygen-containing gases, are known and need not be described in detail. It is apparent that the furnace described above is capable of a flexibility of operation which permits the production of blacks of modified properties of various types, ranging from those which are highly activated, or with a high volatile content, to blacks which are substantially completely de-activated.

The temperatures used in treating the carbon black in the operation of the new furnace will vary, as is well known in the art. Activated blacks may be produced at temperatures as low as 600° F. and de-activated blacks may be produced at temperatures as low as 1000° F., but the temperature will depend upon the length of time the black is in the furnace, the degree of activation or de-activation desired, etc. A furnace constructed as described above has been successfully operated at temperatures ranging up to 1600° F. The temperature of operation is, of course, readily controlled by control of the supply of gas to the burners. Uniform high temperatures and uniform heating of the carbon black are readily maintained.

We claim:

1. A furnace for the treatment of finely divided material such as carbon black comprising a horizontally disposed furnace shell having receiving and discharging ends, at least one channel extending longitudinally through the furnace shell and including a bottom and side walls, said channel having a discharge end projecting beyond the discharge end of the furnace shell, conveyor means in said channel, means for discharging material from the end of the channel which projects beyond the discharge end of the furnace shell, said channel having an opening in the bottom thereof at a place within the furnace shell adjacent the discharge end thereof through which finely divided material may be discharged, a discharge chute positioned to receive finely divided material discharged through said opening, and removable closure means for said opening, said closure means when in closing position forming a portion of the bottom of the channel, so that finely divided material being conveyed along the channel may be discharged through said opening and chute or conveyed to and discharged from the discharge end of the channel, said channel being constructed so as to have the top thereof closed by removable means whereby material being treated in said furnace may be exposed to or shielded from the furnace atmosphere as desired.

2. A furnace for the treatment of finely divided material such as carbon black comprising a horizontally disposed furnace shell having receiving and discharging ends, at least one channel extending longitudinally through the furnace shell, said channel having a discharge end projecting beyond the discharge end of the furnace shell, conveyor means in the channel, a chute through which finely divided material may be discharged from the end of the channel which projects beyond the discharge end of the furnace shell, said channel having an opening in the bottom thereof at a place within the furnace shell adjacent the discharge end thereof through which finely divided material may be discharged, a discharge chute positioned to receive finely divided material discharged through said opening, and removable closure means for said opening, said closure means when in closing position forming a portion of the bottom of the channel, so that finely divided material being conveyed along the channel may be discharged through said opening and said second-mentioned chute, or conveyed to the end of the channel and discharged therefrom through said first-mentioned chute, said first-mentioned chute having adjustable louvres in a side thereof for adjustably controlling the admission of air to the material passing therethrough.

3. A furnace for the treatment of finely divided material such as carbon black comprising a horizontally disposed furnace shell having receiving and discharging ends, at least one channel extending longitudinally through the furnace shell and including a bottom and side walls, said channel having a discharge end projecting beyond the discharge end of the furnace shell, conveyor means in said channel, a chute leading from the end of the channel which projects beyond the discharge end of the furnace shell, said channel having an opening in the bottom thereof at a place within the furnace shell adjacent the discharge end thereof through which finely divided material may be discharged, a discharge chute positioned to receive finely divided material discharged through said opening, and removable closure means for said opening, said closure means when in closing position forming a portion of the bottom of the channel, so that material being conveyed along the channel may be discharged through said opening and said second-mentioned chute, or conveyed to the end of the channel and discharged therefrom through said first-mentioned chute, said first-mentioned chute having adjustable louvres in a side thereof for adjustably controlling the admission of air to material passing therethrough, said channel being constructed so as to have the top thereof closed by removable means, whereby material being treated in said channel may be exposed to or shielded from the furnace atmosphere as desired.

4. A furnace for the treatment of finely divided material such as carbon black comprising a horizontally disposed furnace shell having receiving and discharge ends, at least one channel extending longitudinally through the furnace shell, said channel having a discharge end projecting beyond the discharge end of the furnace shell, conveyor means in the channel, said channel having an opening in the bottom thereof at a place within the furnace shell and adjacent the discharge end thereof through which the finely divided material may be discharged, a closed discharge chute communicating with said opening in the channel for receiving finely divided material discharged therethrough, said chute extending to the outside of the furnace shell and constructed and arranged to permit cooling of material therein substantially out of contact with the atmosphere, and a closed vertically-disposed lift for removing treated material discharged through said closed chute, said lift being in closed communication with the closed discharge chute and constructed so as to cause the material therein to seal the closed chute against entrance of atmospheric air.

5. A furnace for the treatment of finely divided material such as carbon black comprising a horizontally disposed furnace shell having receiving and discharging ends, at least one channel extending longitudinally through the furnace shell, said channel having a discharge end projecting beyond the discharge end of the furnace shell, conveyor means in the channel, said channel having an opening in the bottom thereof at a place within the furnace shell and adjacent the discharge end thereof through which the finely divided material may be discharged, a closed discharge chute communicating with said opening in the channel for receiving finely divided material discharged therethrough, said chute extending to the outside of the furnace shell and constructed and arranged to permit cooling of material therein substantially out of contact with the atmosphere, a chute through which material may be discharged from the end of the channel which projects beyond the discharge end of the furnace shell, and removable closure means for said opening, said closure means when in closing position forming a portion of the bottom of the channel, so that material being conveyed along the channel may be discharged through said opening and said closed chute or conveyed to the end of the channel and discharged therefrom through said second-mentioned chute.

6. A furnace for the treatment of finely divided material such as carbon black comprising a horizontally disposed furnace shell having receiving and discharging ends, at least one channel extending longitudinally through the furnace shell and including a bottom and side walls, said channel having a discharge end projecting beyond the discharge end of the furnace shell, conveyor means in the channel, said channel having an opening in the bottom thereof at a place within the furnace shell and adjacent the discharge end thereof through which the finely divided material may be discharged, a closed discharge chute communicating with said opening in the channel for receiving finely divided material discharged therethrough, said chute extending to the outside of the furnace shell and constructed and arranged to permit cooling of treated material therein substantially out of contact with the atmosphere, a closed vertically-disposed lift for removing treated material discharged through said closed chute, said lift being in closed communication with the closed discharge chute and constructed and arranged so as to cause the material therein to seal the closed chute against entrance of atmospheric air, a chute through which material may be discharged from the end of the channel which projects beyond the discharge end of the furnace shell, and removable closure means for said opening, said closure means when in closing position forming a portion of the bottom of the channel, so that material being conveyed along the channel may be discharged through said opening and said closed discharge chute, or conveyed to the end of the channel and discharged therefrom through said second-mentioned chute, said second-mentioned chute having adjustable louvres in a side thereof for adjustably controlling the admission of air to material passing therethrough, said channel being constructed so as to have the top thereof closed by removable means, whereby material being treated in said channel may be exposed to or shielded from the furnace atmosphere as desired.

BERNARD JOHNSON.
HENRY C. FOSTER.